United States Patent
Rogg et al.

(10) Patent No.: US 9,692,339 B2
(45) Date of Patent: Jun. 27, 2017

(54) METHOD AND SYSTEM FOR ESTIMATING DIFFERENTIAL INDUCTANCES IN AN ELECTRIC MACHINE

(71) Applicant: ABB Schweiz AG, Baden (CH)

(72) Inventors: Tobias Rogg, Siblingen (CH); Luca Peretti, Järfälla (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/015,789

(22) Filed: Feb. 4, 2016

(65) Prior Publication Data

US 2016/0233807 A1 Aug. 11, 2016

(30) Foreign Application Priority Data

Feb. 6, 2015 (EP) .................... 15154185

(51) Int. Cl.
- *H02P 21/00* (2016.01)
- *H02P 21/14* (2016.01)
- *H02P 6/18* (2016.01)
- *H02P 23/00* (2016.01)
- *H02P 21/32* (2016.01)
- *H02P 21/22* (2016.01)

(52) U.S. Cl.
CPC ............ *H02P 21/14* (2013.01); *H02P 6/186* (2013.01); *H02P 21/0003* (2013.01); *H02P 21/22* (2016.02); *H02P 21/32* (2016.02); *H02P 23/0031* (2013.01)

(58) Field of Classification Search
CPC ........... H02P 21/14; H02P 21/22; H02P 21/32
USPC .................................................. 318/400.02
See application file for complete search history.

(56) References Cited

U.S. PATENT DOCUMENTS

| 8,587,234 B2 | 11/2013 | Villwock et al. |
| 2012/0123715 A1 | 5/2012 | Eskola et al. |

FOREIGN PATENT DOCUMENTS

| CN | 101571723 A | 11/2009 |
| CN | 102223059 A | 10/2011 |
| EP | 2270522 B1 | 5/2012 |
| EP | 2453248 A1 | 5/2012 |

(Continued)

OTHER PUBLICATIONS

European Search Report Application No. EP 15154185.1 Completed: Jul. 22, 2015; Mailing Date: Jul. 31, 2015 8 pages.

(Continued)

*Primary Examiner* — Erick Glass
(74) *Attorney, Agent, or Firm* — Whitmyer IP Group LLC

(57) ABSTRACT

A self-commissioning method for estimating differential inductances in an electric machine, such as e.g. a synchronous reluctance machine or interior permanent magnet machine, with cross-magnetization effects is provided. The electric machine is driven with PWM voltages to explore current plurality of operating points of the currents in the electric machine while keeping the electric machine at standstill or quasi-standstill. At each operating point PWM switching voltage transients are used as a small-signal excitation. Currents of the electric machine are measured by means of oversampling, which permit the reconstruction of the waveforms including the current ripple within a PWM period caused by the PWM switching transients. Finally, the differential inductances at each operating point are determined based on the determined direct and quadrature current waveforms and voltages.

24 Claims, 3 Drawing Sheets

(56) References Cited

FOREIGN PATENT DOCUMENTS

EP          2693628 A1    2/2014
WO      2013017386 A1    2/2013

OTHER PUBLICATIONS

Yi Li et al: "Improved Rotor-Position Estimation by Signal Injection in Brushless AC Motors, Accounting for Cross-Coupling Magnetic Saturation", IEEE Transactions on Industry Applications, IEEE Service Center, Piscataway, NJ, US, vol. 45, No. 5, Sep. 1, 2009, pp. 1843-1850.

Zhu Z Q et al: "Compensation for Rotor Position Estimation Error due to Cross-Coupling Magnetic Saturation in Signal Injection Based Sensorless Control of PM Brushless AC Motors", Electric Machines&Drives Conference, 2007. Piscataway, NJ, USA, May 1, 2007, pp. 208-213.

METHOD AND SYSTEM FOR ESTIMATING DIFFERENTIAL INDUCTANCES IN AN ELECTRIC MACHINE

TECHNICAL FIELD

The present invention generally relates to the control of electric machines. Particularly, the invention relates to a self-commissioning method and system for estimating differential inductances in an electric machine, such as e.g. a synchronous reluctance machine or interior permanent magnet machine.

BACKGROUND

The knowledge of the electrical machine magnetic model is decisive in several aspects of its control, especially when strong nonlinearities of the flux linkage appear as in the synchronous reluctance machine. Examples of optimal tuning of PI-controllers in standard vector control are abundant in literature. Adapting the gain according to the machine model ensures the desired dynamics, and even becomes essential to prevent instability of the overall system. On top of that, the success of the most advanced control techniques, for example the Model Predictive Control, is subject to precise parameter knowledge.

Model knowledge also benefits the control by providing the knowledge of the decoupling terms arising from the Park transformation in the rotating dq reference frame. This is especially important when cross-magnetization effects occur. Only the proper compensation of these terms ensures optimal dynamics. Moreover, parameter knowledge implies that the motor can run at optimal performance and best efficiency, for instance according to the Maximum Torque per Ampere (MTPA) trajectory.

In the case of sensorless control, fundamental model-based methods require accurate parameter knowledge. By contrast, saliency-based sensorless control methods can determine the saliency position (geometric or saturation-induced saliency) without any knowledge of the machine parameters as long as cross-magnetisation effects can be neglected. However, when cross-magnetisation plays a role, a phase delay can introduce significant errors on the estimated angle, and therefore it must be estimated.

Last but not least, anomalous machine operation such as faults can be diagnosed on the basis of parameter intelligence. For this, the machine response is compared against an ideal model to detect deviations from the expected behaviour.

Machine parameter estimation can be grouped into two categories: offline and online methods. Offline methods are performed before operating the machine, while the online methods run during normal operation. The proposed solution is part of a class of offline methods known as self-commissioning methods, denoting that the identification of the machine model is performed without the requirement for additional equipment and solely by using the converter connected to the machine, of which the nameplate data are available.

Ideally, self-commissioning estimation methods are performed at standstill or quasi-standstill rotor condition, rendering manual locking and securing of the rotor redundant. Apart from being quicker, the advantages of standstill methods are first of all the maximum safety during the self-identification, as no running parts can harm personnel in the vicinity. Moreover, in contrast to constant-speed methods, no load machine is required. The need for a load machine is especially cumbersome if the machine has already been deployed at the customer facilities. Thirdly, the machine will be identified under the same conditions as during regular operation. This has the potential to include and compensate possible parasitic effects. The fourth and probably most beneficial advantage is the ability to identify the machine parameters on site without having to disconnect the load. This is especially useful for retrofitting purposes, for example when only the power converter is replaced. The other side of the coin, however, is that standstill tests cannot account for space harmonics, for example slot harmonics. In addition, the equipment of the drive system, for example the precision of the current sensors or the inverter nonlinearities, limits the accuracy.

The fact that a standstill estimation procedure runs before the normal operation of the drive gives great possibilities when it comes to injection of signals, as the negative side effects of injection such as torque ripple, noise, harmonics and switching losses are of lower concern during the limited time execution of the procedure. This time leaves also many degrees of freedom when choosing the switching frequency of the converter drive system.

Amongst the numerous procedures for standstill parameter estimation, many assume linear parameters and no cross-magnetization. Traditional procedures are described by IEEE standards, but they lack accuracy and are ineligible for a synchronous reluctance machine or an interior permanent magnet machine, as their strong nonlinearity dictates an operating point-dependent identification.

In some traditional procedures, as e.g. disclosed in B. Stumberger, G. Stumberger, D. Dolinar, A. Hamler, and M. Trlep, "Evaluation of saturation and cross-magnetization effects in interior permanent-magnet synchronous motor," IEEE Transactions on Industry Applications, vol. 39, pp. 1264-1271, September-October 2003, the current of the orthogonal axis is held constant at different levels. To address the issue of thermal variation, the resistance is measured at each voltage step when the current levels off to a steady state. The flux is then recorded via the time integration of the back-electromotive force. The recorded flux tables are approximated by discrete partial derivatives to obtain the differential inductances. The problems with this approach are mostly related to the time integration, due to offsets in the voltage or current measurements, as this can result in the integrated value to drift away. In addition, the voltage level applied by the inverter is low and thus imprecise, especially when dealing with machines with small resistance values.

In a similar method, as disclosed in EP2453248 A1, a voltage pulse in direct or quadrature direction is applied. The flux is obtained according to a Tustin approximation of the time integral of the back-electromotive force, while considering the resistive voltage drop through sampling the current at a substantially high rate. This technique shares the same fundamental flaw of relying on time integration. Moreover, it does not give insight into how the resistance is obtained and lacks compensation of possible resistance variations stemming from thermal variations of the stator windings. Lastly, the work does not mention how the rotor is kept at standstill.

An improved method was proposed in WO 2013/017386. Also here, the current is following the rectangular reference waveform but instead of obtaining the flux by integration, a sinusoidal excitation signal is superimposed on the voltage reference as soon as the current has reached its steady state. The current response is measured and the differential inductance calculated. This is repeated for different amplitudes of the square waveform and the constant orthogonal current in order to cover all operating points. As the differential inductances are recorded, the overall flux can be procured by offline integration over current and a potential bias in the inductance measurement may at worst lead to a slightly less accurate flux linkage, but no drift-away is to be anticipated. On the other hand, the period of the sinusoid must consist of a certain number of PWM periods, forcing the current to stay in the same operating point for a length of time. This in turn may lead to a high speed build-up. On top of this, as different amplitudes of the square waveform are needed, the total duration of the estimation procedure is longer than methods that apply the maximum amplitude and determine the flux linkage while the current is changing.

Finally, all aforementioned methods share the flaw that while the mean torque is kept at zero, the mean speed has a discernible positive offset, causing the mechanical angle to drift away.

YI Li et al. "Improved Rotor-Position Estimation by Signal Injection in Brushless AC Motors Accounting for Cross-Coupling Magnetic Saturation", IEEE Transactions on Industry Applications, IEEE Service Center, Piscataway, N.J., US, vol. 45, no. 5, 1 Sep. 2009 (2009 Sep. 1), pp. 1843-1850 discloses that the d- and q-axis incremental self-inductances, the incremental mutual inductance between the d-axis and the q-axis, and the cross-coupling factor are determined by finite-element analysis.

SUMMARY

It is an aim to provide a self-commissioning method and system for estimating differential inductances in an electric machine, preferably a synchronous electric machine, such as a synchronous reluctance machine or interior permanent magnet machine, which avoids the problems of prior art.

In particular, it is an aim to provide such method and system, by which the differential inductances can be estimated with high accuracy and precision while the electric machine is kept at standstill or quasi-standstill.

A first aspect refers to a self-commissioning method for estimating differential inductances in an electric machine, preferably a synchronous electric machine such as e.g. a synchronous reluctance machine or interior permanent magnet machine, which may have cross-magnetization effects. The electric machine is driven with PWM voltages to explore a plurality of operating points of the currents in the electric machine while keeping the electric machine at standstill or quasi-standstill. At each of the operating points, the PWM switching transients are used as a small-signal voltage excitation. Currents of the electric machine are measured by means of oversampling to permit the reconstruction of the current waveform, wherein the current ripple within a PWM period caused by the PWM switching transients is observed. The term "oversampling" is defined as sampling the currents faster than the sampling required by the current control itself. The oversampling is used to gather information on the current waveform during the self-commissioning procedure.

Direct and quadrature current waveforms are determined from the measured currents of the electric machine while the current ripple within a PWM period is observed. The differential inductances at each operating point of the currents are determined based on the determined direct and quadrature current waveforms and on direct and quadrature voltages of the electric machine, which may be estimated or measured.

The noise on the current waveforms may be reduced by means of recursive curve fitting algorithms, such as e.g. linear regression.

The differential inductances at each operating point of the currents may be determined based on the determined direct and quadrature current waveforms and the voltages by using appropriate filters, observers, or estimators. In one embodiment, a Kalman filter is employed.

In an embodiment, the PWM voltages that generate the current slopes as reconstructed from the oversampling process may be measured directly. In another embodiment, the PWM voltages may be derived from the inverter switching commands and the DC bus voltage.

The PWM voltages may be provided without using any zero voltage vectors. This may be achieved with a modification of the standard PWM algorithm, where the zero vectors are replaced by active vectors while the same voltage reference is maintained.

Any PWM voltage vector is usually composed by a combination of basic, fixed vectors: typically, two active vectors and a zero vector. The no-zero PWM uses three active vectors instead. Without any voltage limitation, the largest voltage vectors (compatible with available the DC bus voltage) could still be produced with two active vectors and a zero vector, or with three active vectors, but the practice reveals that one active vector in the combination will be the dominant one. The dominant vector will be applied for most of the PWM period, and thus the oversampling of the current will return a current ripple which in most part contains ripple coming from one vector only. This causes a linear dependence of the current ripple slopes, which makes the life of the recursive algorithm very difficult. To avoid this situation, in one embodiment, a limitation of the PWM voltages may be provided, in order to reduce the problem of dominant vectors and to avoid that the slopes of the ripple of the currents are mostly linearly dependent on one another within a PWM period.

The PWM voltages may be provided to keep one of the direct and quadrature currents at zero to thereby keep the electric machine at standstill during one part of the self-commissioning method.

The PWM voltages may be provided to keep one of the direct and quadrature currents at a constant value and the other one of the direct and quadrature currents alternating to obtain an oscillating torque with a mean value equal to zero, thereby keeping the electric machine at quasi-standstill during another part of the self-commissioning method.

One of the direct and quadrature currents may be kept at a constant average value by means of using a PI regulator, while the other one of the direct and quadrature currents may be kept alternating by means of using a bang-bang regulator.

Generally speaking, PI control is good for stationary conditions, while bang-bang control is good for transients. It is not immediately possible to use both at the same time, i.e. PI for the current to be held constant and bang-bang for the current to be changed quickly because of the voltage limitation of every converter.

The bang-bang control proposed herein allows the use of a bang-bang regulator at the same time as a PI regulator is used. For this, the voltage required for PI control is first allocated to the PI controller, and then the remaining voltage is allocated to the bang-bang controller.

Alternatives might be using PI controllers for both current components. However, this would either be much slower or the controllability of the current to be held constant would be lost. If bang-bang control were to be used for both currents, it would be very difficult to keep the constant current at its reference.

The alternating current needs a fast regulation if the rotor should be kept at a quasi-standstill condition. With a slow regulation, it may vibrate significantly.

A second aspect refers to a system for estimating differential inductances in an electric machine, preferably a synchronous electric machine such as e.g. a synchronous reluctance machine or interior permanent magnet machine, wherein cross-magnetization effects may be present, which comprises a control and drive arrangement, current sensors, an arrangement for determining direct and quadrature currents, an arrangement for determining direct and quadrature voltages and an arrangement for determining the differential inductances.

The control and drive arrangement is configured to drive the electric machine with PWM voltages to explore a plurality of operating points of the currents in the electric machine while keeping the electric machine at standstill or quasi-standstill, wherein, at each operating point, PWM switching transients are used as a small-signal excitation.

The current sensors are configured to measure currents of the electric machine by means of oversampling to permit the reconstruction of the current waveform, wherein the current ripple within a PWM period caused by the PWM switching transients is observed.

The arrangement for determining direct and quadrature currents is configured to determine the direct and quadrature current waveforms from the measured currents of the electric machine while the current ripple within a PWM period is reconstructed.

Finally, the arrangement for determining the differential inductances is configured to determine the differential inductances at each operating point of the currents based on the determined direct and quadrature current waveforms and on direct and quadrature voltages of the electric machine, which may be estimated or measured.

It shall be appreciated that the system may further comprise arrangements and devices for performing any of the additional method steps as disclosed above with reference to the first aspect.

Further characteristics and advantages will be evident from the detailed description of preferred embodiments of the present invention given hereinafter, and the accompanying FIGS. 1-3, which are given by way of illustration only and thus are not limitative of the present invention.

DETAILED DESCRIPTION

Some synchronous machines exploit the reluctance concept to produce torque. When the reluctance torque is used, both currents on the d and the q axes are used to produce the torque. In this case, it is possible that the machine may have a strongly non-linear relation between current and flux linkages, with saturation effects and more pronounced cross-magnetization effects.

Figure 1:
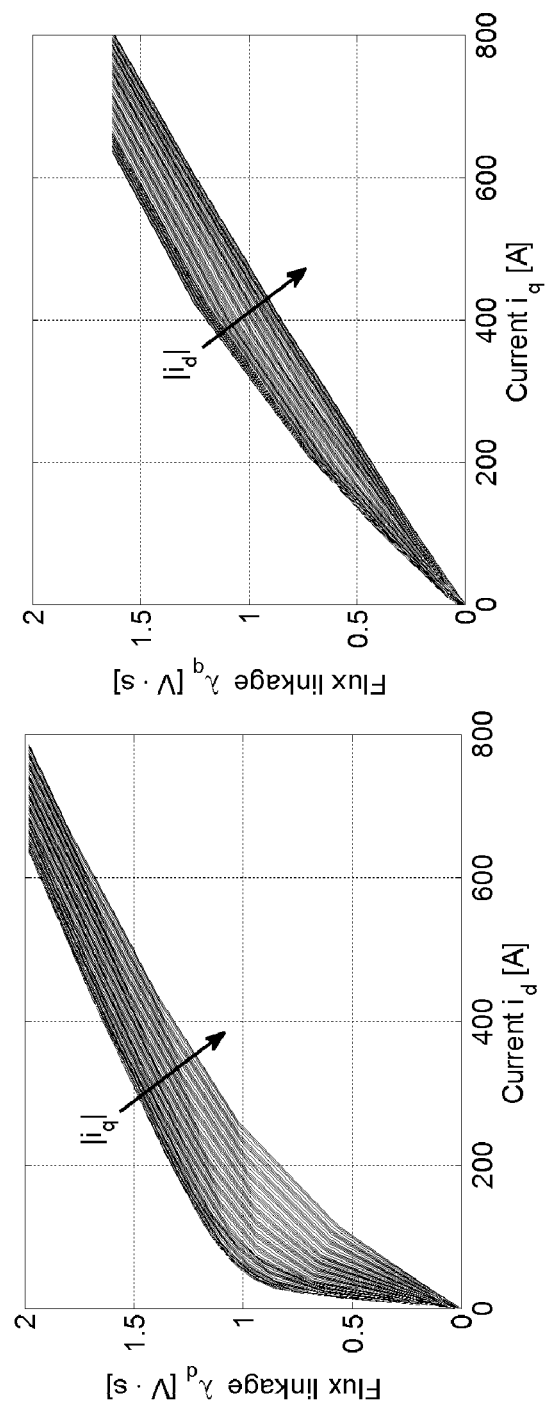
FIG. 1 illustrates schematically flux linkages as a function of direct (left-hand graph) and quadrature (right-hand graph) axis currents, where the cross-magnetization phenomena is evident.

An example is shown in FIG. 1, which illustrates the current-to-flux linkage curves for a synchronous reluctance motor obtained from the finite element method analysis. In FIG. 1, $\lambda_d$ and $\lambda_q$ are the flux linkages in the d and q axes, respectively, and $i_d$ and $i_q$ are the corresponding currents, i.e. a direct axis current component and a quadrature axis current component, respectively, of a current vector. The derivatives of $\lambda_d$ and $X_q$ with respect to $i_d$ and $i_q$, respectively, return the value of the inductances $L_d$ and $L_q$. Inductances $L_d$ and $L_q$ on d and q axes, respectively, are dependent on both currents $i_d$ and $i_q$. In practice, $L_d$ will to the greatest part depend on $i_d$ but also to a smaller extent on $i_q$. This is referred to as the cross-magnetization effect.

The apparent inductance is defined as the ratio of the flux linkage over the current, while the differential inductance is formed by derivation of the flux by the current. In any case, as seen in FIG. 1, the inductances vary as a function of the operating point.

The left-hand side of FIG. 1 shows the flux linkage on the d axis, while the right hand side of FIG. 1 shows the flux linkage on the q axis. Saturation is more visible on the d axis due to the presence of more iron material in the magnetic path, while the q axis has a more "linear" profile due to more air material in the magnetic path.

Figure 2:
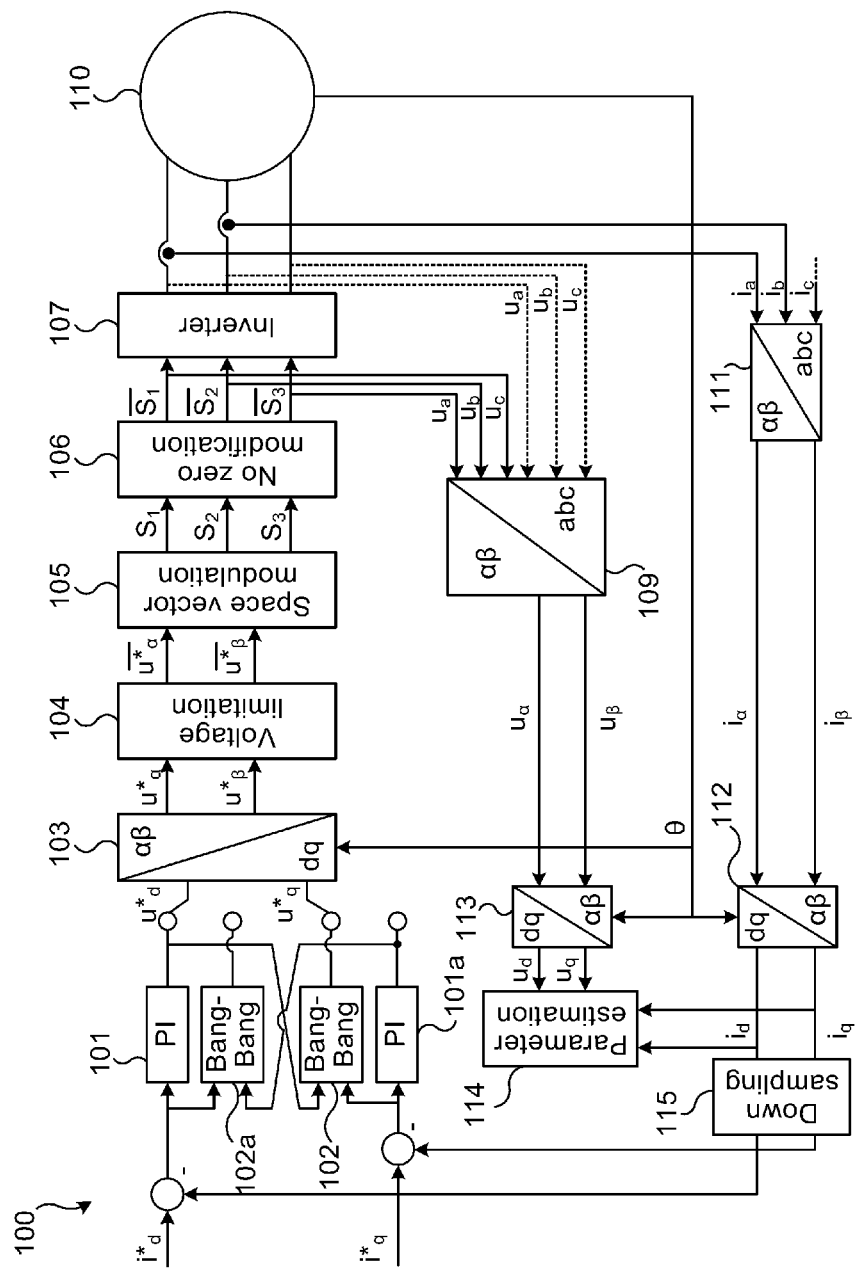
FIG. 2 illustrates schematically, in a block diagram, a control system for an electric machine.

FIG. 2 shows a control system 100 for controlling an electrical machine 110 such as a synchronous machine.

The control system 100 comprises functional blocks, of which many deal with various types of vector transformations. These transformations are performed since they greatly simplify the complexity of the mathematical model of the system.

At some operating points of the currents, a direct axis current reference i*d of a current vector is provided to a PI regulator 101, while a quadrature axis current reference i*q of the current vector is provided to a bang-bang regulator 102. At other operating points of the currents, the direct axis current reference i*d of a current vector is provided to a bang-bang regulator 102a while the quadrature axis current reference i*q of the current vector is provided to a PI regulator 101a. The PI regulators 101 and 101a are used during normal operation, while the bang-bang regulators 102 and 102a are used only during self-commissioning.

The direct axis current component path of the control system 100 is responsible for controlling the flux linkage in the electric machine 110, while the quadrature axis component path is responsible for controlling the machine torque. The PI regulator and the bang-bang outputs are the quadrature axis voltage references $u^*_d$ and $u^*_q$.

A block 103 performs an inverse Park transformation, which is a transformation from a rotating (d, q, Θ) to a stationary (α, β) reference frame, where Θ is the rotor angle. A voltage limitation block 104 is performed in order to ensure the application of two independent voltage vectors.

The voltage limitation block 104 is followed by the No-Zero space vector modulation (SVM) block 105. The space vector modulation (SVM) can directly transform the stator voltage vectors from the two-phase α, β-coordinate system into pulse-width modulation (PWM) signals. SVM generally involves inverse Clarke transformation.

Unlike the conventional SVM, the no-zero SVM block 106 obtains the voltage vectors without using the zero vectors. Thereafter, the electric machine 110 is supplied with a set of PWM drive signals via an inverter 107.

The three machine currents $i_a$, $i_b$, and $i_c$ are measured and fed back to the regulators 101, 102 via a Clarke transformation block 111 and a Park transformation block 112. The Clarke transform transforms a three-axis ($i_a$, $i_b$, $i_c$) two-dimensional coordinate system referenced to the stator of the electric machine 110 onto a two-axis ($i_\alpha$, $i_\beta$) system while maintaining the same reference. This is followed by the Park transformation block 112, which transforms the stationary reference frame ($\alpha$, $\beta$) into the rotating reference frame (d, q). Finally, the actual values $i_d$, $i_q$ of the motor current vector are fed back to the respective regulators 101, 102, whereby closed-loop control is accomplished.

The three machine voltages $u_a$, $u_b$, and $u_c$ can either be estimated and taken from the output of block 106 or are measured at the electric machine 110. The voltages $u_a$, $u_b$, and $u_c$ are fed to an arrangement 114 for parameter estimation via a Clarke transformation block 109 and a Park transformation block 113, which forms direct and quadrature voltages $u_d$ and $u_q$. In FIG. 2 estimated machine voltages $u_a$, $u_b$, and $u_c$ are taken from the output of block 106 as indicated by the solid lines. Alternatively, the machine voltages $u_a$, $u_b$, and $u_c$ are measure at the electric machine 110 as indicated by the dashed lines. If both options should be available, switches may be provided to ensure that only one set of machine voltages $u_a$, $u_b$, and $u_c$ is input to the block 109.

Before operating the electric machine 110 a self-commissioning method for estimating inductances and differential inductances therein is performed. To this end, the arrangement 114 for parameter estimation is configured to determine the differential inductances at each operating point of the currents based on determined direct and quadrature currents and on direct and quadrature voltages of the electric machine, either estimated or measured. The method uses oversampling of the currents of the electric machine, and therefore a down sampling block 115 is provided for downsampling the current for use in the feedback control of the electric machine 110.

Figure 3:
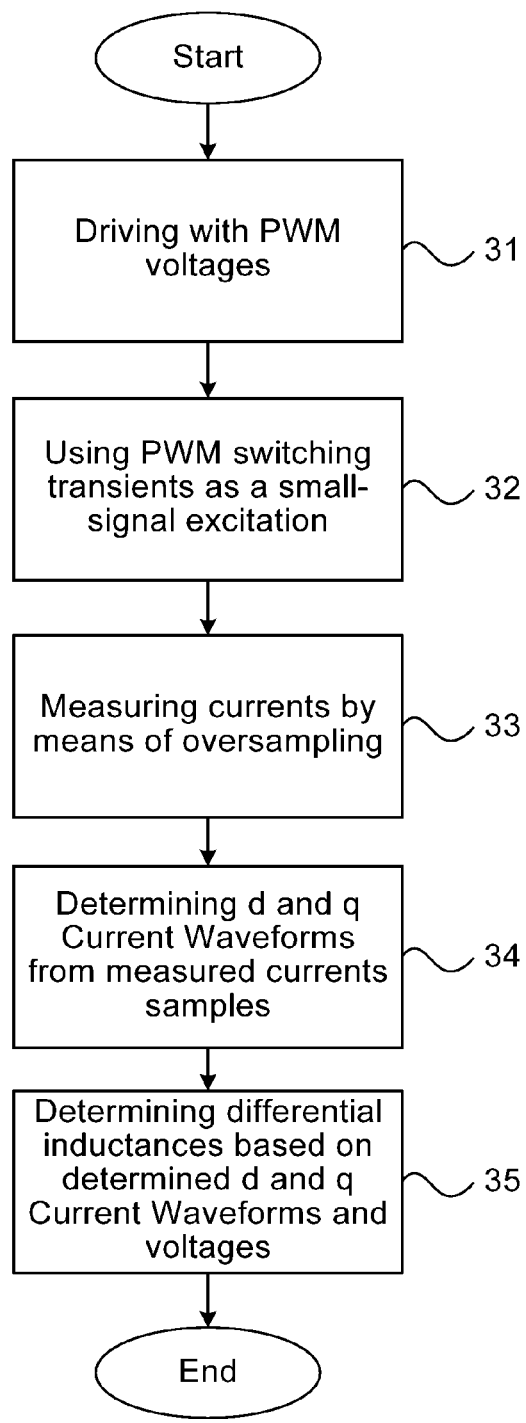
FIG. 3 is a schematic flow scheme of a method for estimating differential inductances in an electric machine with cross-magnetization effects.

FIG. 3 is a schematic flow scheme of the self-commissioning method.

The electric machine 110 is, in a step 31, driven with PWM voltages to explore a plurality of operating points of the currents in the electric machine 110 while keeping the electric machine 110 at standstill or quasi-standstill. At each operating point, PWM switching transients are, in a step 32, used as a small-signal excitation.

Currents of the electric machine 110 are, in a step 33, measured by means of oversampling so as to permit the reconstruction of the current waveform, wherein the current ripple within a PWM period caused by the PWM switching transients is observed. The current slopes may be reconstructed by means of recursive curve fitting algorithms or other recursive algorithms.

The PWM voltages may either be measured or reconstructed from the DC bus voltage and the inverter switching commands.

The PWM voltages may be generated without using any zero voltage vectors because the zero voltage vector is problematic. Firstly it has a tendency to display a linear dependence on reconstructed active voltage straights. Secondly, it brings shallowness of the current slope due to the low resistive voltage drop that is the driving force of the zero vector slope.

The PWM voltages may be provided with a maximum voltage limitation to avoid that the slopes of the ripple of the currents are linearly dependent on one another within a PWM period.

The PWM voltages are provided to keep one of the direct and quadrature currents at zero to thereby keep the electric machine at standstill during one initial part of the self-commissioning procedure, during one part of the self-commissioning procedure.

The PWM voltages are provided to keep one of the direct and quadrature currents at a constant value and the other one of the direct and quadrature currents alternating to obtain an oscillating torque with a mean value equal to zero the thereby keep the electric machine at quasi-standstill, during another part of the self-commissioning procedure.

A PI regulator may be configured to provide PWM voltages to keep said one of the direct and quadrature currents at a constant value, while a bang-bang regulator may be configured to provide PWM voltages to keep said another one of the direct and quadrature currents alternating. Thus, the regulators 101, 102 may, on at a time, be exchanged for a bang-bang regulator during the self-commissioning procedure.

For this, the voltage needed for PI control is calculated first. Then the remaining voltage is applied with either positive or negative sign, depending on the reference, to the other current.

The shape of the alternating component is chosen such that the angle displacement resulting from the torque and speed buildup is centered on zero, thus minimizing the angle displacement in every direction and keeping the machine in quasi-standstill operation.

Direct and quadrature current waveforms are, in a step 34, determined from the measured currents of the electric machine to reconstruct the slopes of the current ripple in a PWM period.

Finally, the inductances and the differential inductances at each operating point of the currents are, in a step 35, determined based on the determined direct and quadrature current slopes and PWM voltages.

The differential inductances at each operating point may be determined based on the determined direct and quadrature current waveforms by using a Kalman filter, which operates recursively on a stream of noisy data to produce an estimate of the system state. It comprises of two main steps, the prediction step and the correction step.

The above embodiments are not limiting but only exemplifying the claimed methods and systems.

What is claimed is:

1. A self-commissioning method for estimating differential inductances in an electric machine, preferably a synchronous electric machine such as e.g. a synchronous reluctance machine or interior permanent magnet machine and/or an electric machine which has cross-magnetization effects, comprising the steps of:

driving the electric machine with PWM voltages to explore a plurality of operating points of the currents in the electric machine while keeping the electric machine at standstill or quasi-standstill;

at each of the operating points, using PWM switching transients as a small-signal voltage excitation;

measuring currents of the electric machine by means of oversampling to permit the reconstruction of the current waveforms, wherein the current ripple within a PWM period caused by the PWM switching transients is observed;

determining direct and quadrature current waveforms from the measured currents of the electric machine while the current ripple within a PWM period is observed; and determining the differential inductances at each of the operating points of the currents based on the determined direct and quadrature current waveforms and on direct and quadrature voltages of the electric machine.

2. The method of claim 1 wherein the differential inductances at each of the operating points are determined based on the determined direct and quadrature current waveforms and voltages by using a recursive algorithm.

3. The method of claim 1 wherein said direct and quadrature voltages are determined from PWM voltages, which are either measured or reconstructed from the bus voltage and inverter switching commands.

4. The method of claim 1 wherein said PWM voltages are provided without using any zero voltage vectors.

5. The method of claim 1 wherein said PWM voltages are provided with a maximum voltage limitation to avoid that the slopes of the ripple of the currents are linearly dependent on one another within a PWM period.

6. The method of claim 1 wherein said PWM voltages are provided to keep one of the direct and quadrature currents at zero to thereby keep the electric machine at standstill.

7. The method of claim 1 wherein said PWM voltages are provided to keep one of the direct and quadrature currents at a constant value and the other one of the direct and quadrature currents alternating to obtain an oscillating torque with a mean value equal to zero and thereby keep the electric machine at quasi-standstill.

8. The method claim 1 wherein the shape of the alternating component keeps the angle displacement resulting from the torque and speed buildup centered on zero, to maintain the quasi-standstill condition.

9. The method of claim 7 wherein said PWM voltages are provided to keep said one of the direct and quadrature currents at a constant value by means of using a PI regulator.

10. The method of claim 7 wherein said PWM voltages are provided to keep said another one of the direct and quadrature currents alternating by means of using a bang-bang regulator.

11. The method of claim 9 wherein a hybrid control scheme is applied, which first calculates the voltage for the PI regulator to hold its current constant, and subsequently use a remaining voltage for the bang-bang regulator.

12. The method of claim 1, wherein oversampling is defined as sampling the currents faster than the sampling required by the current control itself.

13. A system for estimating differential inductances in an electric machine, preferably a synchronous electric machine such as e.g. a synchronous reluctance machine or interior permanent magnet machine and/or an electric machine having cross-magnetization effects, comprising:
a control and drive arrangement for driving the electric machine with PWM voltages to explore a plurality of operating points of the currents in the electric machine while keeping the electric machine at standstill or quasi-standstill, wherein, at each of the operating points, PWM switching voltage transients are used as a small-signal excitation;
sensors for measuring currents of the electric machine by means of oversampling to permit the reconstruction of the current waveforms, wherein the current ripple within a PWM period caused by the PWM switching transients is observed;
an arrangement for determining direct and quadrature current waveforms from the measured currents of the electric machine while the current ripple within a PWM period is observed; and
an arrangement for determining the differential inductances at each operating point of the currents based on the determined direct and quadrature currents and on direct and quadrature voltages of the electric machine.

14. The system of claim 13 wherein the arrangement for determining the differential inductances comprises a recursive algorithm.

15. The system of claim 13 wherein the control and drive arrangement is configured to provide said PWM voltages to keep one of the direct and quadrature currents at zero to thereby keep the electric machine at standstill.

16. The system of claim 13 wherein the control and drive arrangement is configured to provide said PWM voltages to keep one of the direct and quadrature currents at a constant value and the other one of the direct and quadrature currents alternating to obtain an oscillating torque with a mean value equal to zero, to thereby keep the electric machine at quasi-standstill.

17. The system of claim 16 wherein the control and drive arrangement is configured to provide said PWM voltages such that the shape of the alternating current keeps the angle displacement resulting from the torque and speed buildup centered on an initial position, to maintain the quasi-standstill condition with minimal angle displacement.

18. The system of claim 13 wherein the control and drive arrangement is configured to provide said PWM voltages to keep said one of the direct and quadrature currents at a constant value by means of using a PI regulator and to keep said another one of the direct and quadrature currents alternating by means of using a bang-bang regulator.

19. The system of claim 18 wherein the control and drive arrangement is configured to employ a hybrid control scheme, which first calculates the voltage for the PI controller to hold its current constant, and subsequently uses the remaining voltage for the bang-bang controller.

20. The system of claim 13, wherein oversampling is defined as sampling the currents faster than the sampling required by the current control itself.

21. The method of claim 2 wherein said direct and quadrature voltages are determined from PWM voltages, which are either measured or reconstructed from the bus voltage and inverter switching commands.

22. The method of claim 8 wherein said PWM voltages are provided to keep said one of the direct and quadrature currents at a constant value by means of using a PI regulator.

23. The method of claim 10 wherein a hybrid control scheme is applied, which first calculates the voltage for the PI regulator to hold its current constant, and subsequently use a remaining voltage for the bang-bang regulator.

24. The system of claim 14 wherein the control and drive arrangement is configured to provide said PWM voltages to keep one of the direct and quadrature currents at zero to thereby keep the electric machine at standstill.

* * * * *